United States Patent [19]

Weisse

[11] 3,726,970
[45] Apr. 10, 1973

[54] SYNERGISTIC ANTI-BACTERIAL AND ANTI-FUNGAL COMPOSITIONS CONTAINING AN ALKALI METAL SALT OF 2-MERCAPTOPYRIDINE-1-OXIDE AND AN ALKALI CHROMATE

[75] Inventor: Guenter K. Weisse, Northford, Conn.

[73] Assignee: Olin Corporation, New Haven, Conn.

[22] Filed: Feb. 12, 1971

[21] Appl. No.: 115,074

Related U.S. Application Data

[63] Continuation-in-part of Ser. No. 786,410, Dec. 23, 1968, abandoned.

[52] U.S. Cl. .................................. 424/131, 424/263
[51] Int. Cl. ........................ A01n 11/00, A01n 9/22
[58] Field of Search .................... 424/127, 131, 263

[56] References Cited

UNITED STATES PATENTS

| | | | |
|---|---|---|---|
| 2,686,786 | 8/1954 | Shaw et al. | 424/330 X |
| 2,909,459 | 10/1959 | Hovey | 424/263 X |
| 2,944,967 | 7/1960 | Dunklin et al. | 424/131 X |
| 3,235,455 | 2/1966 | Judge et al. | 424/263 X |

OTHER PUBLICATIONS

Hahn, Chemical Abstracts 1955, Vol. 46: 1192b.

*Primary Examiner*—Albert T. Meyers
*Assistant Examiner*—Norman A. Drezin
*Attorney*—Eugene Zagarella, Jr., Gordon D. Byrkit, Donald F. Clements, F. A. Iskander and Thomas P. O'Day

[57] ABSTRACT

This invention relates to synergistic anti-bacterial and anti-fungal compositions comprising mixtures of an alkali metal salt of 2-mercaptopyridine-1-oxide and an alkali metal chromate in the amounts of about 1.5:1 to about 1:7 parts by weight of the mercaptopyridine salt to the chromate salt.

10 Claims, No Drawings

SYNERGISTIC ANTI-BACTERIAL AND ANTI-FUNGAL COMPOSITION CONTAINING AN ALKALI METAL SALT OF 2-MERCAPTOPYRIDINE-1-OXIDE AND AN ALKALI CHROMATE

This application is a continuation-in-part of copending application Ser. No. 786,410 filed Dec. 23, 1968 now abandoned.

This invention relates to synergistic biocidal compositions having broad anti-bacterial and anti-fungal properties. More particularly, this invention relates to a mixture of an alkali metal salt of 2-mercaptopyridine-1-oxide and an alkali metal chromate.

Various synergistic mixtures containing 2-mercaptopyridine-1-oxides have been prepared and disclosed in the literature. For example, U.S. Pat. No. 2,909,459 discloses compositions comprising sodium 2-mercaptopyridine-1-oxide and a water-soluble borate, while synergistic mixtures of 2-mercapto-pyridine-1-oxides and halogenated salicylanilides are disclosed in U.S. Pat. No. 3,235,455. Although these mixtures are effective in certain applications, there is a need for an economical, readily water-soluble biocidal composition which can be effectively employed in small amounts as a fungicide, algaecide, or bactericide.

Now it has been found in accordance with this invention that selected binary compositions exhibit synergism when incorporated into a variety of media, thereby providing an economical, highly effective biocide.

Generally, the synergistic compositions of this invention can comprise widely varying amounts of an alkali metal salt of a 2-mercaptopyridine-1-oxide and an alkali metal chromate depending upon the particular usage. More particularly, the synergistic compositions of this invention comprise between about 1.5:1 to about 1:7 parts by weight of mercaptopyridine salt to alkali metal chromate and preferably from about 1.25:1 to about 1:5. More particularly preferred is a ratio of about 1:1 to about 1:4.

The alkali metal salts of 2-mercaptopyridine-1-oxides employed in the compositions of this invention have the formula:

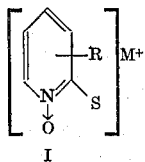

I wherein R is hydrogen, lower alkyl, i.e., alkyl having 1–5 carbon atoms, lower alkoxy, i.e., alkoxy having 1–5 carbon atoms, or halogen and M is an alkali metal, e.g., sodium, potassium, lithium, etc. The alkali metal salts of 2-mercapto-pyridine-1-oxide, i.e., Formula I wherein R is hydrogen, are preferred in the practice of this invention; sodium 2-mercapto-pyridine-1-oxide has been found to be particularly efficacious.

Any alkali metal chromate, e.g., sodium chromate, potassium chromate, lithium chromate, or cesium chromate, can be employed in the compositions of this invention. However, sodium chromate and potassium chromate are employed in the preferred compositions. The alkali metal chromate can be employed in anhydrous or hydrated form; where a hydrated material is used, the composition of the synergistic mixture is calculated on an anhydrous basis.

The compositions of this invention are provided by admixing the aforementioned alkali metal salt of a 2-mercapto-pyridine-1-oxide with the alkali metal chromate in the appropriate amounts. Preferably, these compositions are employed in aqueous solutions.

The synergistic biocidal compositions of this invention have a variety of useful applications. Thus, for example, they are used to inhibit fungal and bacterial growth in starch pastes, gypsum-based dry-wall cements, drilling muds, floor polishes and paints.

These compositions are also effective slimicides for paper; in this application they are admixed with starch and applied to the paper during the sizing operation.

Furthermore, these compositions are particularly effective biocides for industrial cooling towers. These cooling towers are frequently used as part of a recirculating system to permit re-use of water and are prone to organic growth, thereby causing equipment plugging, loss of heat exchange, and general process contamination. When used in this application, the desired concentration of the synergistic composition of this invention is generally maintained by periodic additions of small amounts thereof to the cooling tower. In addition to functioning as a biocide in cooling towers, the synergistic compositions of this invention are excellent corrosion inhibitors for metal parts in the cooling towers. The synergistic compositions of this invention may also be used in other water circulating systems e.g. heat exchangers.

While the biocidal effect of the synergistic compositions of this invention is observed over a wide range of biocide concentration, generally from about 1 to about 1,000 ppm, and preferably from about 5 to about 400 ppm is employed. Greater and lesser amounts can be utilized, depending upon the particular usage, and the ranges set forth herein are not intended to be limiting.

The following examples will serve to illustrate the practice of this invention.

EXAMPLE I

One ml. aliquot of freshly prepared solutions of the biocides, as indicated below, were added to tubes containing Sabauraud Dextrose Broth and the contents of the tubes thoroughly mixed. One ml. aliquots of a 24 hour old culture of Saccharomyces cerevisiae (yeast-fungi) was then added to each tube and the contents again mixed (each tube now containing about 10 ml. of mixture).

At each of the time intervals noted below, a 1 ml. portion of each test mixture was diluted in sterile distilled water. An aliquot of the diluted solution was then placed in a sterile petri dish followed by the addition of Sabauraud Dextrose Agar. The agar was allowed to solidify and the plates incubated at 30°C.

Following the period of incubation the colonies on each plate were counted and the number of organisms present in each diluted aliquot determined (all plating procedures were performed in duplicate). Results are noted below in Table I. In the table, NaMPO and KMPO represent sodium 2-mercaptopyridine-1-oxide and potassium 2-mercaptopyridine-1-oxide respectively.

As shown in Table I, compositions in accordance with this invention displayed marked synergistic biocidal effects. Thus, the composition having a ratio of 1:4 parts of sodium 2-mercaptopyridine-1-oxide to sodium chromate exhibited a 25 percent reduction in the number of organisms per milliliter (3,600 to 2,700) whereas the individual components, sodium 2-mercaptopyridine-1-oxide showed only a trace reduction of less than 2.8 percent (3,600 to 3,500) and the sodium chromate (5 ppm) showed no reduction at all. The composition having a 1:1 ratio of sodium 2-mercaptopyridine-1-oxide and sodium chromate exhibited a 33 percent reduction in the number of organisms (3,600 to 2,400) and the composition having a 1:4 ratio of potassium 2-mercaptopyridine-1-oxide and potassium chromate exhibited a 22.2 percent reduction whereas the components taken individually showed either no reduction or at best only a slight or trace reduction (<2.8 percent). Thus, it can readily be observed that the combined mixtures exhibited a degree of biocidal activity which was significantly greater than what could be expected from the individual components, i.e., they exhibited synergistic effects.

EXAMPLE II

Using a culture of Escherichia-coli (gram negative bacterium) as the organism, the same procedure as outlined in Example I was followed except that Trypticase Soy Broth and Trypticase Soy Agar were used and the incubation temperature was 37°C.

The results are shown in Table II. In the table NaMPO and KMPO represent sodium 2-mercaptopyridine-1-oxide and potassium 2-mercaptopyridine-1-oxide respectively. Reductions in the number of organisms of 66.7 and 71.4 percent were found when using ratios of 1:4 and 1:1 parts of sodium 2-mercaptopyridine-1-oxide to sodium chromate. A reduction of 61.9 percent was noted using a 1:4 ratio of potassium 2-mercapto-pyridine-1-oxide to potassium chromate. The components when taken individually actually showed a substantial increase in the number of organisms, thus it is readily apparent that the combined mixtures exhibited synergistic effects.

EXAMPLE III

The same procedure as noted in Example II was followed using Staphylococcus aureus (gram positive) as the test organism.

The results are noted below in Table III and it is readily apparent that when using a 1:4 or 1:1 ratio of sodium 2-mercaptopyridine-1-oxide to sodium chromate, the resulting reduction displayed marked synergistic biocidal effects over the results noted for the individual components. It is noted that in the table NaMPO represents sodium 2-mercaptopyridine-1-oxide.

EXAMPLE IV

A series of 40 wide-mouth glass jars were provided with 100 grams of 10 percent by weight aqueous starch paste. Varying amounts of biocide, as indicated below, were added and the respective containers allowed to stand at room temperature and inspected at intervals. Failure was indicated by visible growth of mold. In the table, NaMPO indicates sodium 2-mercaptopyridine-1-oxide.

TABLE II.—NUMBER OF ORGANISMS PER MILLILITER [ESCHERICHIA COLI]

| Time, mins. | Control, no biocide | NaMPO | | | | KMPO, 1.0 p.p.m. | Na₂CrO₄ | | K₂CrO₄, 1.0 p.p.m. | NaMPO, 2.5 p.p.m. Na₂CrO₄, 2.5 p.p.m. | NaMPO, 1 p.p.m.; Na₂CrO₄, 4 p.p.m. | KMPO, 1 p.p.m.; K₂CrO₄, 4 p.p.m. |
|---|---|---|---|---|---|---|---|---|---|---|---|---|
| | | 0.2 p.p.m. | 0.45 p.p.m. | 1.0 p.p.m. | 2.5 p.p.m. | | 1.0 p.p.m. | 5.0 p.p.m. | | | | |
| 0 | 1,050 | 1,050 | 1,050 | 1,050 | 1,050 | 1,050 | 1,050 | 1,050 | 1,050 | 1,050 | 1,050 | 1,050 |
| 40 | 1,100 | 1,050 | 1,100 | 1,100 | 1,000 | 1,100 | 1,050 | 1,100 | 1,000 | 1,100 | 1,050 | 1,100 |
| 80 | 1,850 | 1,850 | 1,900 | 1,900 | 1,800 | 1,800 | 1,800 | 1,900 | 2,000 | 1,700 | 1,600 | 1,700 |
| 120 | 2,100 | 2,100 | 2,200 | 2,100 | 2,000 | 2,100 | 2,100 | 2,000 | 2,300 | 1,550 | 1,500 | 1,450 |
| 160 | 3,000 | 2,950 | 2,900 | 2,800 | 2,700 | 2,900 | 3,000 | 3,000 | 3,000 | 1,200 | 1,100 | 1,100 |
| 200 | 3,950 | 4,000 | 4,000 | 3,900 | 3,900 | 4,000 | 4,000 | 4,000 | 3,900 | 950 | 800 | 900 |
| 240 | 5,650 | 5,600 | 5,500 | 5,500 | 5,450 | 5,600 | 6,000 | 6,000 | 5,500 | 300 | 350 | 400 |

TABLE III.—NUMBER OF ORGANISMS PER MILLILITER

[Staphylococcus aureus]

| | Control, no biocide | NaMPO, 2.5 p.p.m. | Na₂CrO₄ 2.5 p.p.m. | NaMPO, 2.5 p.p.m., Na₂CrO₄, 2.5 p.p.m. | NaMPO 1 p.p.m., Na₂CrO₄, 4 p.p.m. |
|---|---|---|---|---|---|
| Time (mins.): | | | | | |
| 0 | $1.25 \times 10^4$ | $9.8 \times 10^3$ | $1.07 \times 10^4$ | $9.85 \times 10^3$ | $9.75 \times 10^3$ |
| 20 | $2.9 \times 10^4$ | $7.2 \times 10^3$ | $1.01 \times 10^4$ | $2.4 \times 10^3$ | $6.1 \times 10^3$ |
| 40 | $1.95 \times 10^4$ | $7.3 \times 10^3$ | $1.28 \times 10^4$ | $2.25 \times 10^3$ | $1.6 \times 10^3$ |
| 60 | $2.02 \times 10^4$ | $5.5 \times 10^3$ | $1.48 \times 10^4$ | $1.45 \times 10^3$ | $9.0 \times 10^2$ |
| 90 | $1.99 \times 10^4$ | $5.0 \times 10^3$ | $1.14 \times 10^4$ | $1.6 \times 10^3$ | $4.0 \times 10^2$ |
| 120 | $2.01 \times 10^4$ | $4.6 \times 10^3$ | $1.36 \times 10^4$ | $6.5 \times 10^2$ | $1.0 \times 10^2$ |
| Percent increase or decrease | +60.8 | −48.3 | +27.1 | −93.4 | −99.0 |

TABLE IV

| | Biocide (ppm) | | Number of Days Preserved |
|---|---|---|---|
| | NaMPO | K₂CrO₄ | |
| Blank | 0 | 0 | 8 |
| Control-I | 10 | 0 | 32 |
| Control-II | 0 | 10 | 11 |
| Composition I | 5 | 5 | 39 |

As shown in the table above, compositions in accordance with this invention display marked synergistic biocidal effects. Thus, a composition comprising one-half of the biocide of Control-I plus one-half the biocide of Control-II would be expected to fail at 32/2 plus 11/2, or 21.5 days. However, Composition I did not fail unti 39 days, thereby proving the synergism of this composition.

EXAMPLE V

A simulated cooling tower was built by filling a polyethylene tank, containing a substantially vertically disposed wooden rack, with 5–8 liters sterilized water. The rack contained 5–8 plates of 1½ inches × 3 inches × ¼ inch white pine panels positioned parallel to the bottom of the tank. The water was circulated over the plates at a rate of 1 liter per minute by means of a polyethylene centrifugal pump connected with ¼ inch plastic tubing; a 2 inches Buchner funnel served as the spray head. The tank was covered loosely with plastic sheet to keep out excessive dirt. The system was run for 1–5 days until the laboratory air caused measurable bacterial contamination ranging from 100,000 to 4,500,000 organisms per ml., as indicted in the table below. Then the appropriate biocide was added to the cooling tower and its efficacy was measured by daily bacterial counts on samples withdrawn while the system was continuously operated and thus exposed to further continuous inoculation from the air.

The bacterial count on the samples was conducted as follows. Samples were diluted with sterilized water 1:100 and 1:10,000. A one ml. aliquot of each dilution was added to 19 ml. of melting sterile TSA (Trypticase Soy Agar) and poured into sterile petri plates. Duplicates of each dilution were made. The plates were incubated at 37°C. for 48 hours and the number of organisms per plate was determined, utilizing a Quebec colony counter. In all the examples, the count fell to between <100—600 organisms per ml. shortly after addition of the biocide. The system remained in this state until about 3 to 4 days before failure at which time the number of organisms grew to about 30,000. Failure, as reported in the table below, was indicated by a bacterial count above 30,000 organisms per ml., the maximum level of contamination permissable by industrial standards.

TABLE V

| Ex | Bacterial count prior to biocide addition (organisms/ml.) | Biocide conc. in ppm | | Number of days preserved |
|---|---|---|---|---|
| | | NaMPO | Na₂CrO₄ | |
| Control-I | $2.07 \times 10^5$ | 10 | 0 | 7 |
| Control-II | $4.5 \times 10^6$ | 0 | 40 | 7.1 |
| Composition I | $1.4 \times 10^5$ | 10 | 40 | 56⁺ (sterile, test discontinued) |
| Composition II | $2.8 \times 10^5$ | 11 | 11 | 42 |
| Composition III | $3.5 \times 10^5$ | 4 | 16 | 52 |

⁺Indicates failure has not yet occurred at the indicated number of days.

The synergism of Composition I to III is apparent by comparing the number of days preserved for these samples with the reported data for the controls. Thus, Composition I, which comprises the sum of the biocides employed in Control-I and Control-II would be expected to preserve for 14.1 days; at 56 days Composition-I had rendered the sample sterile and further testing was discontinued. Even more significant is the results of Composition-III wherein using a ratio of 1:4 parts of sodium-2-mercaptopyridine-1-oxide to sodium chromate, but with only 40 percent of the biocide amounts used in Composition-I and in Controls I and II, a significant preservation of 52 days was still exhibited.

This was far superior to the results which could be expected from the individual ingredients shown in the controls thus clearly establishing the synergism of the composition.

I claim:

1. A synergistic anti-bacterial and anti-fungal composition comprising an alkali metal salt of 2-mercaptopyridine-1-oxide and an alkali metal chromate in the amounts from about 1:1 to about 1:4 parts by weight of said mercaptopyridine salt to said alkali metal chromate, said alkali metal salt of 2-mercaptopyridine-1-oxide is an alkali metal salt selected from the group consisting of sodium and potassium and said alkali metal chromate is selected from the group consisting of sodium chromate and potassium chromate.

2. The synergistic composition of claim 1 wherein sodium 2-mercaptopyridine-1-oxide is employed as the alkali metal salt of 2-mercaptopyridine-1-oxide.

3. The synergistic composition of claim 1 wherein potassium 2-mercaptopyridine-1-oxide is employed as the alkali metal salt of 2-mercaptopyridine-1-oxide.

4. The synergistic composition of claim 2 wherein sodium chromate is said alkali metal chromate.

5. The synergistic composition of claim 2 wherein potassium chromate is said alkali metal chromate.

6. The composition of claim 3 wherein potassium chromate is said alkali metal chromate.

7. A method for inhibiting the bacterial and fungal growth in cooling towers employing water as the heat transfer media, which comprises adding thereto a synergistic anti-bacterial and anti-fungal composition comprising an alkali metal salt of 2-mercaptopyridine-1-oxide and an alkali metal chromate in the amounts of from about 1:1 to about 1:4 parts by weight of said mercaptopyridine salt to said alkali metal chromate, said alkali metal salt of 2-mercaptopyridine-1-oxide is an alkali metal salt selected from the group consisting of sodium and potassium and said alkali metal chromate is selected from the group consisting of sodium chromate and potassium chromate.

8. The method of claim 7 wherein sodium 2-mercapto-pyridine-1-oxide and sodium chromate are employed.

9. The method of claim 7 wherein potassium 2-mercapto-pyridine-1-oxide and potassium chromate are employed.

10. The method of claim 7 wherein sodium 2-mercapto-pyridine-1-oxide and potassium chromate are employed.

* * * * *